US011682767B2

United States Patent
Lin et al.

(10) Patent No.: US 11,682,767 B2
(45) Date of Patent: Jun. 20, 2023

(54) BINDER AND PREPARATION METHOD THEREOF, SECONDARY BATTERY, BATTERY MODULE, BATTERY PACK AND ELECTRICAL DEVICE

(71) Applicant: CONTEMPORARY AMPEREX TECHNOLOGY CO., LIMITED, Ningde (CN)

(72) Inventors: Jianghui Lin, Ningde (CN); Yanjie Zhao, Ningde (CN); Xing Li, Ningde (CN); Haizu Jin, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/866,509

(22) Filed: Jul. 17, 2022

(65) Prior Publication Data

US 2022/0359879 A1 Nov. 10, 2022

Related U.S. Application Data

(63) Continuation of application No. PCT/CN2021/074478, filed on Jan. 29, 2021.

(51) Int. Cl.
   *H01M 4/62* (2006.01)
   *C08F 10/14* (2006.01)
   *C08G 61/10* (2006.01)

(52) U.S. Cl.
   CPC ............ *H01M 4/622* (2013.01); *C08F 10/14* (2013.01); *C08G 61/10* (2013.01)

(58) Field of Classification Search
   None
   See application file for complete search history.

(56) References Cited

U.S. PATENT DOCUMENTS

2017/0298168 A1   10/2017   Reineke et al.

FOREIGN PATENT DOCUMENTS

| CN | 101877393 A | 11/2010 |
|----|-------------|---------|
| CN | 103160224 A | 6/2013  |

(Continued)

OTHER PUBLICATIONS

The Korean Intellectual Property Office Request for the Submission of an Opinion for 10-2022-7025997 6 Pages.
The World Intellectual Property Organization (WIPO) International Search Report and Written Opinion for PCT/CN2021/074478 dated Oct. 14, 2021 14 pages (with translation).

\* cited by examiner

*Primary Examiner* — Ula C Ruddock
*Assistant Examiner* — Tony S Chuo
(74) *Attorney, Agent, or Firm* — Anova Law Group, PLLC

(57) ABSTRACT

A binder includes a copolymer including a building block (I) and a building block (II)

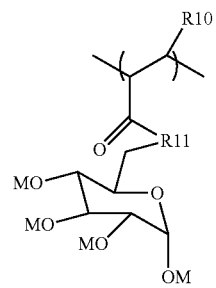

The building block (I) is formed by copolymerizing a building block (i)

(Continued)

and a building block (ii)

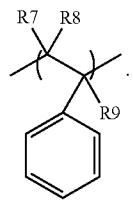

20 Claims, 4 Drawing Sheets

(56) References Cited

FOREIGN PATENT DOCUMENTS

| CN | 103214619 A | | 7/2013 | |
|---|---|---|---|---|
| CN | 103828115 A | | 5/2014 | |
| CN | 104877593 A | | 9/2015 | |
| CN | 108550855 A | * | 9/2018 | ........ H01M 10/0525 |

BINDER AND PREPARATION METHOD THEREOF, SECONDARY BATTERY, BATTERY MODULE, BATTERY PACK AND ELECTRICAL DEVICE

CROSS-REFERENCE TO RELATED APPLICATION

This application is a continuation of International Application No. PCT/CN2021/074478, filed Jan. 29, 2021, the entire content of which is incorporated herein by reference.

TECHNICAL FIELD

The present application belongs to the technical field of electrochemistry. More particularly, the present application relates to a binder and a preparation method thereof, a secondary battery, a battery module, a battery pack and an electrical device.

BACKGROUND ART

With the rapid development of the new energy fields, secondary batteries are widely applied in various large power plants, energy storage systems and various consumer products due to their advantages of excellent electrochemical performance, memoryless effect, less environmental pollution, etc.

In today's production and life, consumers are increasingly demanding the cycling performance of secondary batteries. However, in the existing technologies, binders used for secondary batteries greatly affect the cycling performance of the batteries due to the problems of poor binding and powder falling off an electrode sheet film layer.

Therefore, it is very important to develop a novel binder.

SUMMARY

In view of the problems existing in the background art, the present application provides a binder and a preparation method thereof. The binder of the present application is a multifunctional binder with excellent binding properties as well as dispersing and thickening properties. A secondary battery prepared from the binder of the present application has excellent cycling performance and improved battery internal resistance.

An objective of the present application is to provide a binder with a binding function, a dispersing function and a thickening function as well as a preparation method thereof.

An objective of the present application is to provide a secondary battery with significantly improved battery internal resistance and excellent cycling performance as well as a preparation method thereof.

The inventors have found that one or more of the above objectives can be achieved by adopting the technical solutions of the present application.

A first aspect of the present application provides a binder comprising a copolymer comprising a building block (I) and a building block (II), wherein the building block (I) is formed by copolymerizing a building block (i) and a building block (ii),

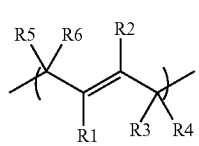

(i)

in the building block (i), R1-R6 each independently represent a hydrogen atom, a halogen atom, an unsubstituted or substituted alkyl with 1-6 carbon atoms, an unsubstituted or substituted alkoxy with 1-6 carbon atoms, an unsubstituted or substituted alkenyl with 1-6 carbon atoms, an unsubstituted or substituted aryl with 6-20 carbon atoms, hydroxyl, or amino, and the substituents in the substituted alkyl with 1-6 carbon atoms, the substituted alkoxy with 1-6 carbon atoms, the substituted alkenyl with 1-6 carbon atoms, and the aryl with 6-20 carbon atoms in R1-R6 are selected from at least one of hydroxyl, amino, amido, cyano, carboxyl, or a halogen atom,

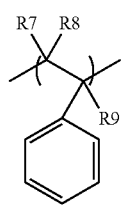

(ii)

in the building block (ii), R7-R9 each independently represent a hydrogen atom, an unsubstituted or substituted alkyl with 1-6 carbon atoms, an unsubstituted or substituted alkoxy with 1-6 carbon atoms, an unsubstituted or substituted alkylamino with 1-6 carbon atoms, an unsubstituted or substituted alkenyl with 1-6 carbon atoms, an unsubstituted or substituted aryl with 6-20 carbon atoms, hydroxyl, or amino, and the substituents in the substituted alkyl with 1-6 carbon atoms, the substituted alkoxy with 1-6 carbon atoms, the substituted alkylamino with 1-6 carbon atoms, the substituted alkenyl with 1-6 carbon atoms, and the substituted aryl with 6-20 carbon atoms in R7-R9 are selected from at least one of hydroxyl, carboxyl, amino, amido, or a halogen atom,

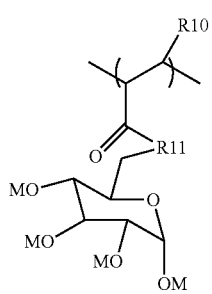

(II)

in the building block (II), R10 represents a hydrogen atom, a halogen atom, an unsubstituted or substituted alkyl with 1-6 carbon atoms, an unsubstituted or substituted alkoxy with 1-6 carbon atoms, an unsubstituted or substituted alkenyl with 1-6 carbon atoms, an unsubstituted or substituted aryl with 6-20 carbon atoms, hydroxyl, or amino, and the substituents in the substituted alkyl with 1-6 carbon atoms, the substituted alkoxy with 1-6 carbon atoms, the substituted alkenyl with 1-6 carbon atoms, and the aryl with 6-20 carbon atoms in R10 are selected from at least one of hydroxyl, carboxyl, amino, amido, cyano, or a halogen atom, and R11 represents a bridging oxo group or a bridging imino group, and a plurality of M each independently represent one of Li, Na, K, Rb and Cs.

The binder of the present application is a novel binder. Since the structure of the copolymer thereof comprises a binding end structure composed of a building block (i) and a building block (ii) and a dispersing end structure composed of a building block (II), the multifunctionality of the binder is determined, that is, the binder has binding, dispersing and thickening functions.

The binder of the present application can effectively ameliorate the problem of powder falling off an electrode sheet film layer caused by binder floating and improve the binding power between the electrode sheet film layer and a current collector; and a slurry containing the binder of the present application has a viscosity that is beneficial to the electrical performance of a battery, so the binder of the present application has both excellent dispersing and thickening properties and can significantly ameliorate the problems of particle agglomeration in the slurry and the slurry being too thin. The binder of the present application has excellent binding, dispersing and thickening properties and comprehensively improves the cycling performance of the battery. Secondly, since the binder of the present application has significantly improved binding properties, the binding power between various substances in the film is relatively strong, and therefore, the electrode sheet prepared with the binder of the present application has a relatively low electrode sheet resistance, which is beneficial to reduce the polarization loss during a battery reaction process, reduces the occurrence of side reactions, and is beneficial to the exertion of the capacity of the battery.

In any of embodiments, in the copolymer, the building block (i) and the building block (ii) are copolymerized in one of random, block and alternating manners, and the building block (i) and the building block (ii), as a whole, are copolymerized with the building block (II) in one of random, block and alternating manners.

In any of embodiments, the ratio of the monomeric average molar number a of the building block (i) and the monomeric average molar number b of the building block (ii) to the monomeric average molar number c of the building block (II) is $(a+b)/c=0.1\text{--}10$, optionally 0.5-4.

Although the mechanism is not yet clear, the inventors have found after a lot of research and experiments that the relationship $(a+b)/c$ between the monomeric average molar numbers of the building block (i), the building block (ii) and the building block (II) in the copolymer of the present application greatly affects the binding properties of the binder of the present application, as well as the resistance and cycling performance of the secondary battery.

When $(a+b)/c$ is in the appropriate range (0.1-10), it can be ensured that the synthesized binder has excellent binding properties, dispersing properties and thickening effect. The resistance of the corresponding electrode sheet is relatively low and the cycling performance of the battery is relatively good.

Furthermore, by further setting the number average molecular weight of the copolymer in the range of 300,000 to 1,000,000, the corresponding secondary battery has a relatively low electrode sheet resistance and a relatively good cycling performance (compared to those manufactured with copolymers with other number average molecular weight ranges).

In any of embodiments, the ratio of the monomeric average molar number a of the building block (i) to the monomeric average molar number b of the building block (ii) is $a/b=1\text{-}50$, optionally 1-13.

Although the mechanism is not yet clear, the inventors have found after a lot of research and experiments that the ratio $a/b$ of the monomeric average molar number a of the building block (i) to the monomeric average molar number b of the building block (ii) greatly affects the binding properties of the binder of the present application, as well as the resistance and cycling performance of the secondary battery.

By setting $a/b$ in the appropriate range (1-50), it can be ensured that the synthesized binder has better binding and anti-swelling properties, the corresponding electrode sheet has a relatively low resistance, and the finally manufactured secondary battery has improved cycling performance.

In any of embodiments, in the building block (i), R1-R6 each independently represent a hydrogen atom or an unsubstituted or substituted linear, branched, or cyclic alkyl with 1-6 carbon atoms, optionally a hydrogen atom or a linear or branched alkyl with 1-3 carbon atoms, optionally a hydrogen atom or a linear alkyl with 1-3 carbon atoms.

In any of embodiments, in the building block (ii), R7-R9 each independently represent a hydrogen atom or an unsubstituted or substituted linear, branched, or cyclic alkyl with 1-6 carbon atoms, optionally a hydrogen atom or a linear or branched alkyl with 1-3 carbon atoms, optionally a hydrogen atom or a linear alkyl with 1-3 carbon atoms.

By defining the types of the groups R1-R9, the steric hindrance of the corresponding copolymer can be in a range that is beneficial to the exertion of the performance of the secondary battery. By defining the types of the groups R1-R9, the steric hindrance of the binding end structure of the copolymer can be located in a rational range, such that the binding properties of the binder result in neither excessive viscosity nor excessive dispersion, thereby ensuring that the binding properties of the corresponding binder are superior, the resistance of the manufactured electrode sheet is relatively low, and the cycling performance of the finally manufactured secondary battery is more excellent.

In any of embodiments, in the building block (II), R10 represents a hydrogen atom, a halogen atom, or an unsubstituted or substituted linear, branched, or cyclic alkyl with 1-6 carbon atoms, optionally a hydrogen atom or a linear or branched alkyl with 1-3 carbon atoms, optionally a hydrogen atom or a linear alkyl with 1-3 carbon atoms.

In any of embodiments, in the building block (II), R11 represents a bridging oxo group.

By defining the types of the groups R10 and R11, the steric hindrance of the corresponding copolymer can be in a range that is beneficial to the exertion of the performance of the secondary battery. By defining the types of the groups R10 and R11, the steric hindrance of the dispersing end structure of the copolymer can be located in a rational range, such that the binding properties of the binder result in neither excessive viscosity nor excessive dispersion, while ensuring the thickening effect of the binder, thereby ensuring that the resistance of the manufactured electrode sheet is relatively low and that the cycling performance of the finally manufactured secondary battery is superior.

In any of embodiments, in the building block (II), a plurality of M each independently represent one of Li, Na, and K.

In any of embodiments, the number average molecular weight of the copolymer is 50,000 to 2,000,000, optionally 300,000 to 1,000,000.

By setting the number average molecular weight of the copolymer in the range of 50,000 to 2,000,000, it can be ensured that the synthesized binder has excellent binding properties, dispersing properties and thickening effect. In addition, the binder having the above-mentioned functions is applied to a secondary battery, and the secondary battery has improved electrode sheet resistance and more excellent cycling performance.

Furthermore, by setting the number average molecular weight of the copolymer in the range of 300,000 to 1,000,000, the binder has more excellent binding properties, the corresponding secondary battery has a relatively low electrode sheet resistance and a relatively good cycling performance (compared to those manufactured with copolymers with other number average molecular weight ranges).

On the other hand, the appropriate number average molecular weight of the copolymer can also ensure that the synthesized binder has a high mechanical strength, a high thermal stability and a suitable elasticity, so as to avoid the rupture of the electrode sheet film layer when the battery undergoes external force and avoid the melting and decomposition of the copolymer due to local high temperature inside the battery, causing the function failure of the binder.

A second aspect of the present application provides a preparation method of a binder, the method comprising:

a step of synthesizing a building block (II);

a step of polymerizing a building block (i) with a building block (ii) to form a building block (I); and a step of further adding the building block (II) to the building block (I) to form a copolymer contained in the binder.

The preparation method of a binder provided in the second aspect of the present application is beneficial to large-scale industrialization. The binder prepared according to the method of the present application has both high binding properties and dispersing properties, and a secondary battery comprising the binder has improved battery internal resistance and excellent cycling performance.

A third aspect of the present application provides a secondary battery comprising a negative electrode sheet and a positive electrode sheet, wherein the negative electrode sheet comprises the binder of the first aspect of the present application or a binder prepared according to the preparation method of the second aspect of the present application.

In any of embodiments, the positive electrode sheet comprises the binder of the first aspect of the present application or a binder prepared according to the preparation method of the second aspect of the present application.

A fourth aspect of the present application provides a battery module comprising the secondary battery of the third aspect of the present application.

A fifth aspect of the present application provides a battery pack comprising one or more of the secondary battery of the third aspect of the present application or the battery module of the fourth aspect of the present application.

A sixth aspect of the present application provides an electrical device comprising one or more of the secondary battery of the third aspect of the present application, the battery module of the fourth aspect of the present application, or the battery pack according to the fifth aspect of the present application. The secondary battery or battery module or battery pack can be used as a power source for the electrical device or an energy storage unit for the electrical device.

The battery module, battery pack and electrical device of the present application comprise the secondary battery provided by the present application, and thus have at least the same advantages as the secondary battery.

DETAILED DESCRIPTION

Figure 1:
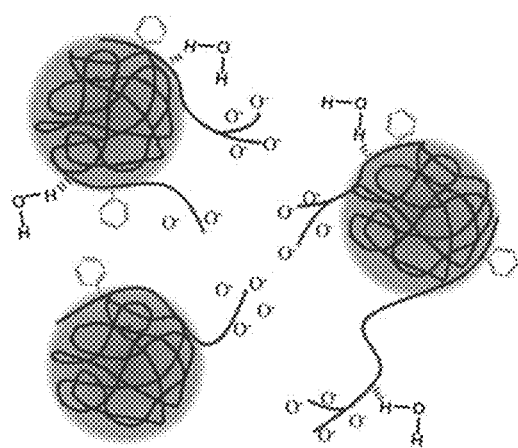
FIG. 1 is a schematic diagram of a product of a binder according to an embodiment of the present application.

Hereinafter, embodiments of the binder and the preparation method thereof, the secondary battery, the battery module, the battery pack, and the electrical device of the present application are described in detail and specifically disclosed with reference to the accompanying drawings as appropriate. However, there are some cases in which unnecessary detailed descriptions are omitted. For example, there are cases in which detailed descriptions of well-known matters or repeated descriptions of actual identical structures are omitted. This is to avoid unnecessary redundancy in the following descriptions and to facilitate the understanding of those skilled in the art. In addition, the accompanying drawings and subsequent descriptions are provided for those skilled in the art to fully understand the present application, and are not intended to limit the subject matter recited in the claims.

For the sake of brevity, the present application specifically discloses some numerical ranges. However, any lower limit can be combined with any upper limit to form a range that is not explicitly recited, any lower limit can be combined with any other lower limit to form a range that is not explicitly recited, and similarly, any upper limit can be combined with any other upper limit to form a range that is not explicitly recited. In addition, each individually disclosed point or individual numerical value can itself be used as a lower limit or an upper limit to combine with any another point or individual numerical value or with another lower limit or upper limit to form a range not explicitly recited.

In today's production and life, consumers are increasingly demanding the cycling performance of secondary batteries. However, in the existing technologies, binders used for secondary batteries greatly affect the cycling performance of the batteries due to the problems of poor binding and powder falling off an electrode sheet film layer.

Active materials, conductive agents, binders, solvents and some additives are all essential in the positive and negative electrode slurries of the currently industrialized secondary battery.

However, through previous experiments, the inventors have found that in the secondary battery, although the binder plays an important role in binding the film layer containing the active material and the conductive agent with the current collector, the addition of the binder easily causes excessive agglomeration to occur in the positive/negative electrode slurry. Therefore, it is necessary to add a dispersant to the positive or negative electrode slurry of the secondary battery. Secondly, in order to help improve the binding properties of the binder, it is generally further necessary to add a thickener to the positive/negative electrode slurry. Therefore, it is often necessary to add various additives to the positive/negative electrode slurry of the secondary battery.

The inventors of the present application have creatively developed and designed a novel multifunctional binder with binding, dispersing and thickening functions, starting from the expansion of the functions of the binder.

The binder of the present application can effectively ameliorate the problem of powder falling off an electrode sheet film layer caused by binder floating and improve the binding power between the electrode sheet film layer and a current collector; and a slurry containing the binder of the present application has a viscosity that is beneficial to the electrical performance of a battery, so the binder of the present application has both excellent dispersing and thickening properties and can significantly ameliorate the problems of particle agglomeration in the slurry and the slurry being too thin. The binder of the present application has excellent binding, dispersing and thickening properties and comprehensively improves the cycling performance of the battery. Secondly, since the binder of the present application has significantly improved binding properties, the binding power between various substances in the film is relatively strong, and therefore, the electrode sheet prepared with the binder of the present application has a relatively low electrode sheet resistance, which is beneficial to reduce the polarization loss during a battery reaction process, reduces the occurrence of side reactions, and is beneficial to the exertion of the capacity of the battery.

Binder

In an embodiment of the present application, a binder is provided, and a schematic diagram of a product thereof is as shown in FIG. 1. The binder comprises a copolymer comprising a building block (I) and a building block (II), wherein the building block (I) is formed by copolymerizing a building block (i) and a building block (ii),

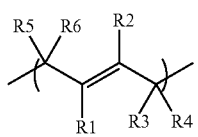
(i)

in the building block (i), R1-R6 each independently represent a hydrogen atom, a halogen atom, an unsubstituted or substituted alkyl with 1-6 carbon atoms, an unsubstituted or substituted alkoxy with 1-6 carbon atoms, an unsubstituted or substituted alkenyl with 1-6 carbon atoms, an unsubstituted or substituted aryl with 6-20 carbon atoms, hydroxyl, or amino, and the substituents in the substituted alkyl with 1-6 carbon atoms, the substituted alkoxy with 1-6 carbon atoms, the substituted alkenyl with 1-6 carbon atoms, and the aryl with 6-20 carbon atoms in R1-R6 are selected from at least one of hydroxyl, amino, amido, cyano, carboxyl, or a halogen atom,

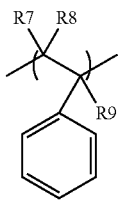
(ii)

in the building block (ii), R7-R9 each independently represent a hydrogen atom, an unsubstituted or substituted alkyl with 1-6 carbon atoms, an unsubstituted or substituted alkoxy with 1-6 carbon atoms, an unsubstituted or substituted alkylamino with 1-6 carbon atoms, an unsubstituted or substituted alkenyl with 1-6 carbon atoms, an unsubstituted or substituted aryl with 6-20 carbon atoms, hydroxyl, or amino, and the substituents in the substituted alkyl with 1-6 carbon atoms, the substituted alkoxy with 1-6 carbon atoms, the substituted alkylamino with 1-6 carbon atoms, the substituted alkenyl with 1-6 carbon atoms, and the substituted aryl with 6-20 carbon atoms in R7-R9 are selected from at least one of hydroxyl, carboxyl, amino, amido, or a halogen atom,

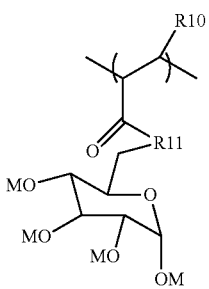
(II)

in the building block (II), R10 represents a hydrogen atom, a halogen atom, an unsubstituted or substituted alkyl with 1-6 carbon atoms, an unsubstituted or substituted alkoxy with 1-6 carbon atoms, an unsubstituted or substituted alkenyl with 1-6 carbon atoms, an unsubstituted or substituted aryl with 6-20 carbon atoms, hydroxyl, or amino, and the substituents in the substituted alkyl with 1-6 carbon atoms, the substituted alkoxy with 1-6 carbon atoms, the substituted alkenyl with 1-6 carbon atoms, and the aryl with 6-20 carbon atoms in R10 are selected from at least one of hydroxyl, carboxyl, amino, amido, cyano, or a halogen atom, and R11 represents a bridging oxo group or a bridging imino group, and a plurality of M each independently represent one of Li, Na, K, Rb and Cs.

The binder of the present application is a novel binder, as shown in FIG. 1. Since the structure of the copolymer thereof comprises a binding end structure and a dispersing end structure, the multifunctionality of the binder is determined, that is, the binder has binding, dispersing and thickening functions.

The building block (i) and the building block (ii) of the copolymer contained in the binder of the present application are a binding end structure that plays a binding role, which can bind the active material, the conductive agent and other substances in the positive/negative electrode slurry and is the main contributing building block with excellent binding properties in the binder of the present application. Therefore, the binder of the present application can effectively prevent the detachment of the positive/negative electrode film layers caused by binder floating, effectively reduce the loss of the active material, and thereby improve the cycling performance of the secondary battery. In addition, the more excellent binding properties of the binder is also beneficial to reduce the electrode sheet resistance, thereby reducing the internal resistance of the whole battery, to reduce side reactions during the battery reaction process, and to maximize the exertion the capacity of the battery.

The building block (II) of the copolymer contained in the binder of the present application is a dispersing end structure that plays a dispersing role. The building block (II) has a negatively charged —O-group, and the repulsive force (electrostatic repulsion) between the copolymer molecules in the slurry relies on the —O-group repulsion force, so that the binder of the present application has excellent dispersing effect.

The hydrophobic backbone of the copolymer contained in the binder of the present application can associate with the surrounding water molecules via hydrogen bonds, thereby increasing the fluidic volume of the copolymer itself, reducing the space for free movement of particles, and increasing the viscosity of the system. Therefore, in addition to the excellent binding and dispersing properties, the binder of the present application also has excellent thickening effect, which is beneficial to improve the stability of the electrode sheet and the cycling performance of the battery.

In summary, the binder of the present application can effectively ameliorate the problem of powder falling off an electrode sheet film layer caused by binder floating and improve the binding power between the electrode sheet film layer and a current collector; and a slurry containing the binder of the present application has a viscosity that is beneficial to the electrical performance of a battery, so the binder of the present application has both excellent dispersing and thickening properties and can significantly ameliorate the problems of particle agglomeration in the slurry and the slurry being too thin. The binder of the present application has excellent binding, dispersing and thickening properties and comprehensively improves the cycling performance of the battery. Secondly, the binder of the present application has significantly improved binding properties, so that the binding power between various substances in the film is relatively strong, and therefore, the electrode sheet prepared with the binder of the present application has a relatively low electrode sheet resistance, which is beneficial to reduce the polarization loss during a battery reaction process, reduces the occurrence of side reactions, and is beneficial to the exertion of the capacity of the battery.

In some embodiments, optionally, in the copolymer, the building block (i) and the building block (ii) are copolymerized in one of random, block and alternating manners, and the building block (i) and the building block (ii), as a whole, are copolymerized with the building block (II) in one of random, block and alternating manners.

In some embodiments, the copolymer may further comprise additional building blocks within a range that does not impair the effects of the present application. The additional building blocks may include, but are not limited to, building blocks derived from olefins, building blocks derived from halogenated olefins, building blocks derived from cycloalkanes, etc. Within the range that does not impair the effects of the present application, the derived additional building blocks may or may not have a substituent.

In some embodiments, optionally, the ratio of the monomeric average molar number a of the building block (i) and the monomeric average molar number b of the building block (ii) to the monomeric average molar number c of the building block (II) is $(a+b)/c=0.1\text{-}10$, optionally 0.5-4.

Although the mechanism is not yet clear, the inventors have found after a lot of research and experiments that the relationship $(a+b)/c$ between the monomeric average molar numbers of the building block (i), the building block (ii) and the building block (II) in the copolymer of the present application greatly affects the binding properties of the binder of the present application, as well as the resistance and cycling performance of the secondary battery. The specific effects are as follows:

When $(a+b)/c$ is in the appropriate range (0.1-10), it can be ensured that the synthesized binder has excellent binding properties, dispersing properties and thickening effect. The resistance of the corresponding electrode sheet is relatively low and the cycling performance of the battery is relatively good.

Furthermore, by further setting the number average molecular weight of the copolymer in the range of 300,000 to 1,000,000, the corresponding secondary battery has a relatively low electrode sheet resistance and a relatively good cycling performance (compared to those manufactured with copolymers with other number average molecular weight ranges).

When the ratio of $(a+b)/c$ is less than 0.1, it is indicated that the proportion of the building block (II) in the binder increases, while the overall proportion of the building block (ii) and the building block (i) decreases, causing the synthesized slurry to be relatively thin, which affects the binding properties of the binder, and the resistance of the correspondingly manufactured electrode sheet increases accordingly, which ultimately affects the cycling performance of the manufactured secondary battery.

When the ratio of $(a+b)/c$ exceeds 10, it is indicated that the proportion of the building block (II) in the binder decreases, while the overall proportion of the building block (ii) and the building block (i) increases, which reduces the dispersing effect of the binder, causing the active material and conductive carbon in the slurry to be unevenly dispersed, ultimately improving the resistance of the corresponding electrode sheet and reducing the cycling performance of the finally manufactured secondary battery. In addition, the processing of the electrode sheet is also adversely affected.

Optionally, the value of $(a+b)/c$ can be 0.1, 0.5, 0.9, 1.2, 1.6, 1.8, 2.6, 3.2, 3.3, 3.5, 3.9, 5.2, 8.9, 9.2, or 9.3, or a value within a range obtained by combining any two of the above values.

In some embodiments, optionally, the ratio of the monomeric average molar number a of the building block (i) to the monomeric average molar number b of the building block (ii) is a/b=1-50, optionally 1-13.

Although the mechanism is not yet clear, the inventors have found after a lot of research and experiments that the ratio a/b of the monomeric average molar number a of the building block (i) to the monomeric average molar number b of the building block (ii) greatly affects the binding properties of the binder of the present application, as well as the resistance and cycling performance of the secondary battery. The specific effects are as follows:

By setting a/b in the appropriate range (1-50), it can be ensured that the synthesized binder has better binding and anti-swelling properties, the corresponding electrode sheet has a relatively low internal resistance, and the finally manufactured secondary battery has improved cycling performance.

After a lot of experiments and research, when the ratio of a/b is less than 1, the synthesized binder has relatively poor elastic properties and a relatively brittle texture, which greatly affects the elastic properties of the electrode sheet film layer and in turn affects the resistance of the electrode sheet and the cycling performance of the battery.

After a lot of experiments and research, when the ratio of a/b exceeds 50, the binding properties of the synthesized binder will be affected to a certain extent, and the resistance of the electrode sheet and the cycling performance of the battery will be affected to a certain extent.

Optionally, the value of a/b can be 1, 2, 3, 4, 5, 9, 10, 13, 15, 20, 26, 33, 35, 46, or 48, or a value within a range obtained by combining any two of the above values.

In some embodiments, optionally, in the building block (i), R1-R6 each independently represent a hydrogen atom or an unsubstituted or substituted linear, branched, or cyclic alkyl with 1-6 carbon atoms, optionally a hydrogen atom or a linear or branched alkyl with 1-3 carbon atoms, optionally a hydrogen atom or a linear alkyl with 1-3 carbon atoms.

In some embodiments, optionally, in the building block (ii), R7-R9 each independently represent a hydrogen atom or an unsubstituted or substituted linear, branched, or cyclic alkyl with 1-6 carbon atoms, optionally a hydrogen atom or a linear or branched alkyl with 1-3 carbon atoms, optionally a hydrogen atom or a linear alkyl with 1-3 carbon atoms.

By defining the types of the groups R1-R9, the steric hindrance of the corresponding copolymer can be in a range that is beneficial to the exertion of the performance of the secondary battery. By defining the types of the groups R1-R9, the steric hindrance of the binding end structure of the copolymer can be located in a rational range, such that the binding properties of the binder result in neither excessive viscosity nor excessive dispersion, thereby ensuring that the binding properties of the corresponding binder are superior, the resistance of the manufactured electrode sheet is relatively low, and the cycling performance of the finally manufactured secondary battery is more excellent.

In some embodiments, optionally, in the building block (II), R10 represents a hydrogen atom, a halogen atom, or an unsubstituted or substituted linear, branched, or cyclic alkyl with 1-6 carbon atoms, optionally a hydrogen atom or a linear or branched alkyl with 1-3 carbon atoms, optionally a hydrogen atom or a linear alkyl with 1-3 carbon atoms.

In some embodiments, optionally, in the building block (II), R11 represents a bridging oxo group.

By defining the types of the groups R10 and R11, the steric hindrance of the corresponding copolymer can be in a range that is beneficial to the exertion of the performance of the secondary battery. By defining the types of the groups R10 and R11, the steric hindrance of the dispersing end structure of the copolymer can be located in a rational range, such that the binding properties of the binder result in neither excessive viscosity nor excessive dispersion, while ensuring the thickening effect of the binder, thereby ensuring that the resistance of the manufactured electrode sheet is relatively low and that the cycling performance of the finally manufactured secondary battery is superior.

In some embodiments, optionally, in view of the convenience and availability of raw materials and the reduction of production costs, a plurality of M in the building block (II) each independently represent one of Li, Na, and K.

In some embodiments, the number average molecular weight of the copolymer is 50,000 to 2,000,000, optionally 300,000 to 1,000,000.

By setting the number average molecular weight of the copolymer in the range of 50,000 to 2,000,000, it can be ensured that the synthesized binder has excellent binding properties, dispersing properties and thickening effect. In addition, the binder having the above-mentioned functions is applied to a secondary battery, and the secondary battery has improved electrode sheet resistance and more excellent cycling performance.

Furthermore, by setting the number average molecular weight of the copolymer in the range of 300,000 to 1,000,000, the binder has more excellent binding properties, the corresponding secondary battery has a relatively low electrode sheet resistance and a relatively good cycling performance (compared to those manufactured with copolymers with other number average molecular weight ranges).

On the other hand, the appropriate number average molecular weight of the copolymer can also ensure that the synthesized binder has a high mechanical strength, a high thermal stability and a suitable elasticity, so as to avoid the rupture of the electrode sheet film layer when the battery undergoes external force and avoid the melting and decomposition of the copolymer due to local high temperature inside the battery, causing the function failure of the binder.

Optionally, the number average molecular weight of the copolymer of the present application can be 320,000, 370,000, 480,000, 490,000, 500,000, 550,000, 590,000, 600,000, 630,000, 770,000, 980,000, 1,260,000, 1,530,000, 1,670,000, or 1,890,000, or a value within a range obtained by combining any two of the above values.

In some embodiments, optionally, the binder of the present application can be synthesized by a preparation method comprising:

a step of synthesizing a building block (II);

a step of polymerizing a building block (i) with a building block (ii) to form a building block (I); and a step of further adding the building block (II) to the building block (I) to form a copolymer contained in the binder.

The substance synthesized by the preparation method of the present application can be directly used as a binder, or can also be purified as required prior to being used as a binder.

Specifically, the process of the synthesis of the copolymer is as follows:

1. Preparation of a Building Block (II)

(1) Raw material 1 is dissolved in a solvent;

(2) a triphenylmethyl-based substance is added to the solvent of (1), an additional hydroxyl protecting agent is then added, and a hydrogen halide HX, is then added; and (3) a catalyst and raw material 2 are then added to finally obtain the building block (II) containing a secondary carbon protecting group.

Optionally, in step (1), raw material 1 can be glucose or glucosamine.

Optionally, in step (1), compounds commonly used in the art can be used as the solvent as necessary. Specifically, the solvent includes, but is not limited to, pyridine, picoline, tetrahydrofuran, etc.

Optionally, in step (2), the triphenylmethyl-based substance is a protecting agent for protecting primary carbon hydroxyl groups in glucose or glucosamine, and can be one or more of triphenylchloromethane (TrCl), p-methoxytriphenylmethylchloromethane (MMTCl), dimethoxytriphenylchloromethane (DMTCl), etc.

Optionally, in step (2), the additional hydroxyl protecting agent can be one or more of acetic anhydride, benzoic anhydride, and pivalic anhydride, and the additional hydroxyl protecting agent can protect secondary hydroxyl groups in glucose or glucosamine.

Optionally, in step (2), HX can be hydrogen bromide or hydrogen chloride, and can remove the protecting group from the primary carbon hydroxyl group.

Optionally, in step (3), raw material 2 may be an acryl-based substance, and for specific substances, reference can be made to the Examples section.

Optionally, in step (3), the catalyst is not particularly limited as long as it has a catalysis function in step 3), and can be, for example, triethylamine.

2. Polymerization of a Building Block (i) with a Building Block (ii) to Form a Building Block (I)

(1) Raw material 3, raw material 4 and a chain transfer agent are added to the solvent, and evacuation is performed;

(2) after the evacuation is completed, under the condition of continuously introducing an inert gas, an initiator is added to the system of (1), and the mixture is then stirred and reacted under heating conditions for several hours; and (3) the obtained reaction product is poured into glacial ether at 0° C. for sedimentation to obtain a powder of the building block (I).

Optionally, in step (1), raw material 3 may be a styrene-based substance, and for specific substances, reference can be made to the Examples section.

Optionally, in step (1), raw material 4 may be a conjugated-diene-based substance, and for specific substances, reference can be made to the Examples section.

Optionally, in step (1), compounds commonly used in the art can be used as the solvent as necessary. Specifically, the solvent includes, but is not limited to, pyridine, picoline, tetrahydrofuran, etc.

Optionally, in step (1), compounds commonly used in the art can be used as the initiator as necessary. Specifically, the initiator includes, but is not limited to, azo species, peroxy species, persulfates, etc.

Optionally, the same solvent and initiator in step 2 may be the same as in step 1, or may be different solvent and initiator.

Optionally, in step (1), the chain transfer agent may be synthesized according to a published synthesis method or may be a compound commonly used in the art. Specifically, it includes, but is not limited to, 4-cyano-4-(propylthiocarbonylthio)thiovaleric acid (CPP), aliphatic thiols, etc.

In addition, optionally, in step (2), the heating temperature can be set to 50-80° C., optionally 60-80° C. The reaction time may be 10-15 hours.

3. Copolymerization of the Building Block (II) with the Building Block (I) to Form the Copolymer of the Present Application (1) the Building block (I) of step 2 and the building block (II) of step 1 are dissolved in a solvent, and evacuation is performed;

(2) under the condition of continuously introducing an inert gas, an initiator is added to the above system, and the mixture is then stirred and reacted under heating conditions for several hours;

(3) the obtained product is poured into glacial ether at 0° C. for sedimentation;

(4) the white solid powder resulting from sedimentation is dissolved, and a reagent for removing the secondary carbon hydroxyl protecting group is added and stirred for 3-5 h;

(5) after the stirring is completed, the reaction product is concentrated with a rotary evaporator; and (6) the concentrated reaction product is transferred to a dialysis bag for dialysis and freeze-dried to obtain the copolymer of the present application.

Optionally, in step (1), compounds commonly used in the art can be used as the solvent as necessary. Specifically, the solvent includes, but is not limited to, pyridine, picoline, tetrahydrofuran, etc.

Optionally, in step (2), compounds commonly used in the art can be used as the initiator as necessary. Specifically, the initiator includes, but is not limited to, azo species, peroxy species, persulfates, etc.

Optionally, the same solvent and initiator in step 3 may be the same as in step 1 or 2, or may be different solvent and initiator.

Optionally, in step (2), the heating temperature can be set to 50-80° C., optionally 60-80° C. The reaction time may be 10-15 hours.

Optionally, in step (4), for the reagent for removing the secondary carbon hydroxyl protecting group, reference can be made to the examples.

In some embodiments, optionally, during the preparation of the copolymer, step 1 and step 2 are not in order, and either step 1 or step 2 may be first carried out.

The preparation method of a binder provided in the present application is beneficial to large-scale industrialization. The binder prepared according to the method of the present application has high binding properties, excellent dispersing properties and thickening effect, and the secondary battery comprising the binder has improved battery internal resistance and excellent cycling performance.

In the embodiments of the present application, optionally, the present application provides a secondary battery comprising an electrode sheet. The electrode sheet prepared with the binder of the present application has significantly reduced electrode sheet resistance, which is beneficial to reduce the battery internal resistance of the secondary battery and in turn reduce side reactions in the battery, and is beneficial to the exertion of the battery capacity.

In some embodiments, optionally, the electrode sheet comprises a negative electrode sheet and a positive electrode sheet.

In some embodiments, optionally, the negative electrode sheet comprises the binder of the first aspect of the present application or the binder prepared according to the preparation method of the second aspect of the present application.

In some embodiments, optionally, the positive electrode sheet comprises the binder of the first aspect of the present application or a binder prepared according to the preparation method of the second aspect of the present application.

Negative Electrode Sheet

The negative electrode sheet comprises a negative electrode current collector and a negative electrode film layer disposed on at least one surface of the negative electrode current collector, wherein the negative electrode film layer comprises a negative electrode active material and the binder of the first aspect of the present application or the binder prepared by the method according to the second aspect of the present application.

By way of example, the negative electrode current collector has two surfaces opposite in its own thickness direction, and the negative electrode film layer is disposed on either or both of the two opposite surfaces of the negative electrode current collector.

In the secondary battery of the present application, for the negative electrode current collector, a metal foil or a composite current collector may be used. For example, a copper foil may be used as the metal foil. The composite current collector may comprise a high molecular material substrate layer and a metal layer formed on at least one surface of the high molecular material matrix. The composite current collector can be formed by forming a metal material (such as copper, a copper alloy, nickel, a nickel alloy, titanium, a titanium alloy, silver, and a silver alloy) on a high molecular material matrix (e.g., matrix made of polypropylene (PP), polyethylene terephthalate (PET), polybutylene terephthalate (PBT), polystyrene (PS), polyethylene (PE), etc.).

In the secondary battery of the present application, the negative electrode film layer generally comprises a negative electrode active material and the binder of the first aspect of the present application or a binder prepared according to the preparation method of the second aspect of the present application, and is generally formed by coating and drying the negative electrode slurry. The negative electrode slurry is formed by dispersing the negative electrode active material, an optional conductive agent, the binder of the present application, etc., in a solvent and stirring the mixture until uniform. The solvent can be N-methylpyrrolidone (NMP) or deionized water.

By way of example, the conductive agent may be selected from one or more of superconducting carbon, acetylene black, carbon black, Ketjen black, carbon dots, carbon nanotubes, graphene, and carbon nanofibers.

In the secondary battery of the present application, in addition to the negative electrode active material, the negative electrode film layer may further optionally include an additional commonly used negative electrode active material. For example, as the additional commonly used negative electrode active material, artificial graphite, natural graphite, soft carbon, hard carbon, silicon matrix materials, tin matrix materials, lithium titanate, etc., may be listed. The silicon matrix material can be selected from one or more of elemental silicon, a silicon-oxygen compound, a silicon-carbon complex, a silicon-nitrogen complex, and a silicon alloy. The tin matrix material can be selected from one or more of elemental tin, a tin-oxygen compound, and a tin alloy.

Positive Electrode Sheet

The positive electrode sheet comprises a positive electrode current collector and a positive electrode film layer disposed on at least one surface of the positive electrode current collector, wherein the positive electrode film layer comprises a positive electrode active material and the binder of the first aspect of the present application or the binder prepared by the method according to the second aspect of the present application.

By way of example, the positive electrode current collector has two opposite surfaces in the direction of its own thickness, and the positive electrode film layer is provided on either or both of the two opposite surfaces of the positive electrode current collector.

In the present application, the positive electrode current collector may be a metal foil or a composite current collector. For example, an aluminum foil may be used as the metal foil. The composite current collector may comprise a high molecular material substrate layer and a metal layer formed on at least one surface of the high molecular material substrate layer. The composite current collector can be formed by forming a metal material (such as aluminum, an aluminum alloy, nickel, a nickel alloy, titanium, a titanium alloy, silver, and a silver alloy) on a high molecular material substrate (e.g., substrates made of polypropylene (PP), polyethylene terephthalate (PET), polybutylene terephthalate (PBT), polystyrene (PS), polyethylene (PE), etc.).

The positive electrode film layer comprises a positive electrode active material, and the positive electrode active material may include, but is not limited to, lithium cobaltate, lithium nickel manganese cobaltate, lithium nickel manganese aluminate, lithium iron phosphate, lithium vanadium phosphate, lithium cobalt phosphate, lithium manganese phosphate, lithium iron silicate, lithium vanadium silicate, lithium cobalt silicate, lithium manganese silicate, spinel lithium manganate, spinel lithium nickel manganate, lithium titanate, etc. One or more of these can be used as the positive electrode active material.

The positive electrode film layer further optionally comprises a conductive agent. However, the type of the conductive agent is not specifically limited, and those skilled in the art can make a selection according to actual requirements. By way of example, the conductive agent for the positive electrode film layer may be selected from one or more of superconducting carbon, acetylene black, carbon black, Ketjen black, carbon dots, carbon nanotubes, graphene, and carbon nanofibers.

In the present application, the positive electrode sheet can be prepared according to a method known in the art. By way of example, the positive electrode active material, conductive agent and binder can be dispersed in a solvent (such as N-methyl pyrrolidone (NMP)) to form a uniform positive electrode slurry; and the positive electrode slurry is coated on the positive electrode current collector, and after drying, cold pressing and other processes, a positive electrode sheet is obtained. Specifically, the binder of the present application may be used as the binder in the positive electrode slurry, or another binder known by those skilled in the art for positive electrode slurries may also be used.

Electrolyte

An electrolyte plays a role in conducting ions between the positive electrode sheet and the negative electrode sheet. In the present application, the type of the electrolyte is not specifically limited and can be selected according to requirements. For example, the electrolyte may be selected from at least one of a solid electrolyte or a liquid electrolyte (i.e., electrolyte solution).

In some embodiments, an electrolyte solution is used as the electrolyte. The electrolyte solution comprises an electrolyte salt and a solvent.

In some embodiments, the electrolyte salt may be selected from one or more of lithium hexafluorophosphate (LiPF6), lithium tetrafluoroborate (LiBF4), lithium perchlorate (LiClO4), lithium hexafluoroarsenate (LiAsF6), lithium bis(fluorosulfonyl)imide (LiFSI), lithium bis(trifluoromethanesulfonyl)imide (LiTFSI), lithium trifluoromethanesulfonate (LiTFS), lithium difluoro(oxalato)borate (LiDFOB), lithium bis(oxalate)borate (LiBOB), lithium difluorophosphate (LiPO$_2$F$_2$), lithium difluoro bis(oxalato)phosphate (LiDFOP) and lithium tetrafluoro(oxalato)phosphate (LiTFOP).

In some embodiments, the solvent may be selected from one or more of ethylene carbonate (EC), propylene carbonate (PC), ethyl methyl carbonate (EMC), diethyl carbonate (DEC), dimethyl carbonate (DMC), dipropyl carbonate (DPC), methyl propyl carbonate (MPC), ethyl propyl carbonate (EPC), butylene carbonate (BC), fluoroethylene carbonate (FEC), methyl formate (MF), methyl acetate (MA), ethyl acetate (EA), propyl acetate (PA), methyl propionate (MP), ethyl propionate (EP), propyl propionate (PP), methyl butyrate (MB), ethyl butyrate (EB), 1,4-butyrolactone (GBL), sulfolane (SF), methyl sulfonyl methane (MSM), ethyl methyl sulfone (EMS), and diethyl sulfone (ESE).

In some embodiments, additives may also be optionally contained in the electrolyte solution. For example, the additives may include negative electrode film-forming additives, may also include positive electrode film-forming additives, and may also include additives that can improve certain properties of a battery, such as additives that improve the overcharge performance of a battery, additives that improve the high temperature performance of a battery, additives that improve the low-temperature performance of a battery, etc.

Separator

Secondary batteries using electrolyte solutions and some secondary batteries using solid electrolytes further comprise a separator. A separator is provided between the positive electrode sheet and the negative electrode sheet, and functions to separate. In the present application, the type of the separator is not particularly limited and can be selected from any well-known porous structure separator having good chemical stability and mechanical stability. In some embodiments, the material of the separator can be selected from one or more of glass fibers, a non-woven cloth, polyethylene, polypropylene, and polyvinylidene fluoride. The separator may be a single-layer membrane or may also be a multi-layer composite membrane and is not particularly limited. When the separator is a multi-layer composite membrane, the material of each layer may be the same or different and is not particularly limited.

Secondary Battery

In some embodiments, the positive electrode sheet, the negative electrode sheet and the separator can be manufactured into an electrode assembly by means of a winding process or a lamination process.

In some embodiments, the secondary battery may include an outer package. The outer package can be used for encapsulating the above-mentioned electrode assembly and electrolyte.

In some embodiments, the outer package of the secondary battery can be a hard case, such as a hard plastic case, an aluminum case, a steel case, and the like. The outer package of the secondary battery can also be a soft pack, such as a bag-type soft pack. The material of the soft pack can be a plastic, and examples as plastics include polypropylene (PP), polybutylene terephthalate (PBT) and polybutylene succinate (PBS).

Figure 6:
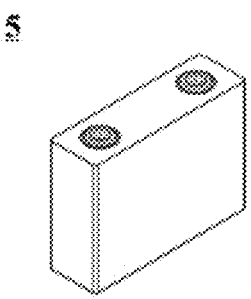
FIG. 6 is a schematic diagram of a secondary battery according to an embodiment of the present application.

The shape of the secondary battery is not particularly limited in the present application, and may be cylindrical, square or of any other shapes. For example, FIG. 6 is an example of secondary battery 5 having a square structure.

Figure 7:
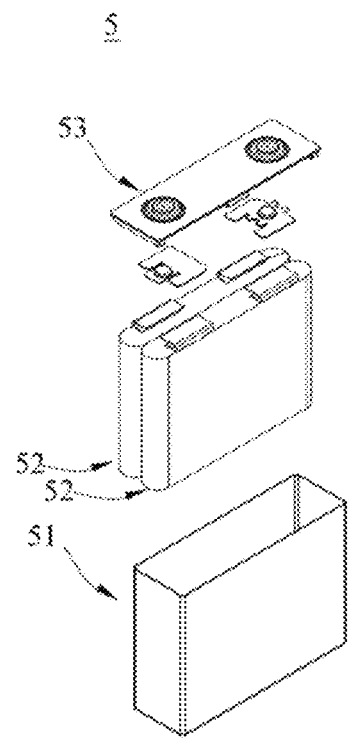
FIG. 7 is an exploded diagram of the secondary battery according to the embodiment of the present application as shown in FIG. 6.

In some embodiments, referring to FIG. 7, the outer package can include a case 51 and a cover plate 53. Here, the case 51 can include a bottom plate and a side plate connected to the bottom plate, with the bottom plate and the side plate enclosing to form an accommodating cavity. The case 51 has an opening that is in communication with the accommodating cavity, and the cover plate 53 can cover the opening to close the accommodating cavity. The positive electrode sheet, the negative electrode sheet and the separator may be manufactured into an electrode assembly 52 by means of a winding process or a lamination process. The electrode assembly 52 is packaged in the accommodating cavity. The electrolyte solution infiltrates the electrode assembly 52. The number of electrode assemblies 52 included in the secondary battery 5 may be one or more, and can be selected by those skilled in the art according to specific actual requirements.

Battery Module

In some embodiments of the present application, optionally, a battery module is provided, comprising the secondary battery of the present application.

In some embodiments, the secondary battery can be assembled into a battery module, the number of secondary batteries included in the battery module can be one or more, and the specific number can be selected by those skilled in the art according to the application and capacity of the battery module.

Figure 8:
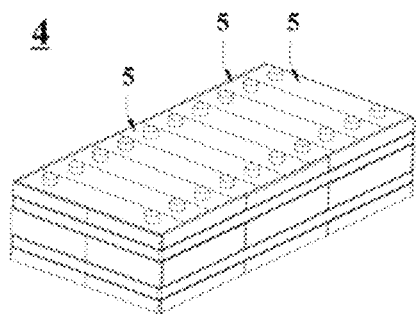
FIG. 8 is a schematic diagram of a battery module according to an embodiment of the present application.

FIG. 8 is an example of battery module 4. Referring to FIG. 8, in the battery module 4, a plurality of secondary batteries 5 can be sequentially arranged along the length direction of the battery module 4. Of course, any other arrangement is also possible. Furthermore, a plurality of secondary batteries 5 can be fixed with fasteners.

Optionally, the battery module 4 may further comprise a shell having an accommodating space in which a plurality of secondary batteries 5 are accommodated.

In some embodiments of the present application, optionally, a battery pack is provided, comprising one or more of the secondary battery of the present application or the battery module of the present application.

Battery Pack

In some embodiments, the battery module of the present application may also be assembled into a battery pack, and the number of battery modules included in the battery pack can be selected by those skilled in the art according to the application and capacity of the battery pack.

Figure 9:
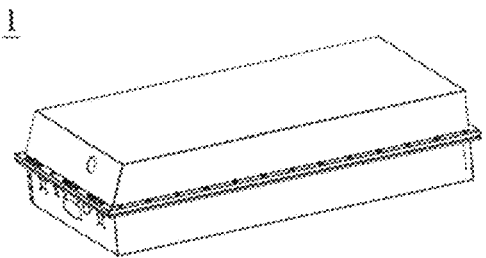
FIG. 9 is a schematic diagram of a battery pack according to an embodiment of the present application.
Figure 10:
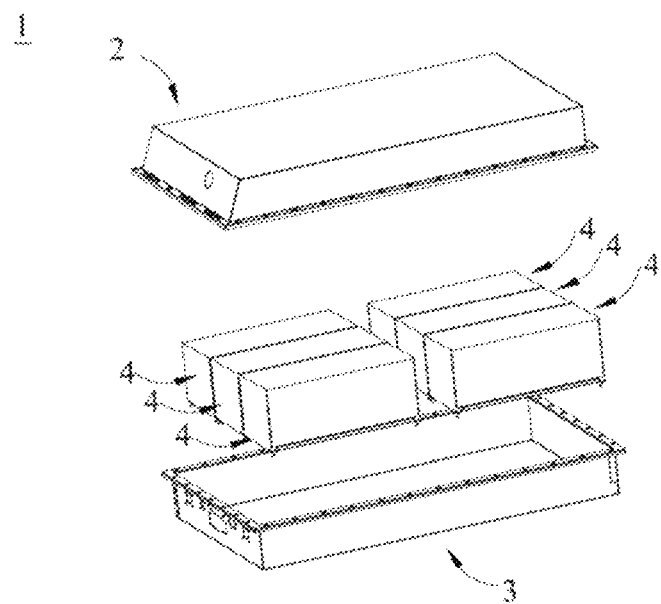
FIG. 10 is an exploded diagram of the battery pack according to the embodiment of the present application as shown in FIG. 9.

FIG. 9 is an example of battery pack 1. Referring to FIG 10, the battery pack 1 can include a battery box and a plurality of battery modules 4 provided in the battery box. The battery box includes an upper box 2 and a lower box 3, wherein the upper box 2 can cover the lower box 3, and forms an enclosed space for accommodating the battery module 4. a plurality of battery modules 4 may be arranged in the battery box in any manner.

Electrical Device

In some embodiments of the present application, optionally, an electrical device is provided, comprising one or more of the secondary battery of the present application, the battery module of the present application, or the battery pack of the present application. The secondary battery or battery module or battery pack can be used as a power source for the electrical device or an energy storage unit for the electrical device.

The electrical device can be, but is not limited to, a mobile device (such as a mobile phone and a laptop), an electric vehicle (such as an all-electric vehicle, a hybrid electric vehicle, a plug-in hybrid electric vehicle, an electric bicycle, an electric scooter, an electric golf cart, and an electric truck), an electric train, a ship, a satellite, an energy storage system, etc.

The secondary battery, the battery module, or the battery pack can be selected as the electrical device according to use requirements.

Figure 11:
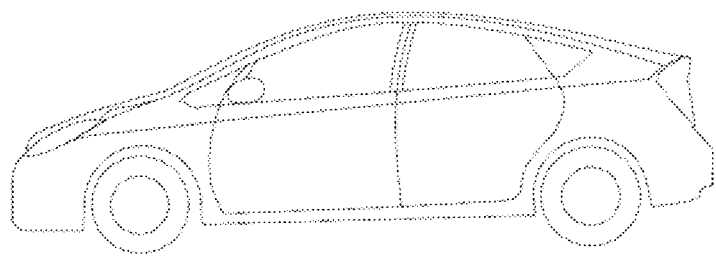
FIG. 11 is a schematic diagram of an electrical device according to an embodiment of the present application in which the secondary battery is used as a power source.

FIG. 11 is an example of an electrical device. The electrical device is an all-electric vehicle, a hybrid electric vehicle, or a plug-in hybrid electric vehicle, etc. In order to meet the high power and high energy density requirements of the secondary battery for the device, a battery pack or a battery module can be used.

As another example, the electrical device may be a mobile phone, a tablet computer, a laptop, etc. The device is generally required to be thin and light, and a secondary battery can be used as a power source.

EXAMPLES

Hereinafter, the examples of the present application are illustrated. The examples described below are exemplary, only used to explain the present application, and should not be construed as a limitation to the present application. Where specific techniques or conditions are not specified in the examples, the techniques or conditions described in the literatures of the art or the product specifications are followed. Where manufacturers are not specified, the reagents or instruments used are conventional products that are commercially available.

Preparation of Binder

Example 1

1. Preparation of a Building Block (II)

72 g of glucose (CAS: 492-62-6) was weighed and added into 50 mL of a pyridine solvent, 28 g of triphenylchloromethane was added to protect the hydroxyl group at position 6, 20 g of acetic anhydride was then added to protect the hydroxyl groups at the other positions, 20 g of a hydrogen bromide solution was then added to a reaction flask to remove the protecting group at position 6, and 36 g of methacryloyl chloride (CAS: 920-46-7) was then added under the catalysis of 10 mL of triethylamine to finally obtain the building block (II) containing protecting groups as represented by the following structural formula

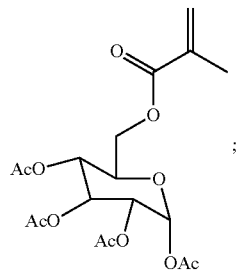 [SMILES: C=C(C)C(=O)OCC1OC(OC(C)=O)C(OC(C)=O)C(OC(C)=O)C1OC(C)=O]

2. Polymerization of a Building Block (i) with a Building Block (ii) to Form a Building Block (I)

19 g of styrene (CAS: 100-42-5), 5.4 g of butadiene (CAS: 106-99-0) and 0.5 g of 4-cyano-4-(propylthiocarbonylthio)thiovaleric acid (CPP), a chain transfer agent, were weighed and dissolved in a three-necked flask containing 200 mL of tetrahydrofuran, and evacuation was carried out. After the evacuation was completed, under the condition of continuously introducing N2, 0.05 g of an azobisisobutyronitrile initiator was added to the above-mentioned three-necked flask, and the three-necked flask was then heated to 70° C. After stirring and reacting at 70° C. for 12 h, the obtained product was poured into glacial ether at 0° C. for sedimentation to obtain a first precursor powder;

3. Copolymerization of the Building Block (I) with the Building Block (II) to Form a Copolymer 100 g of the building block (I) and 120 g of the building block (II) in step 1 were weighed and dissolved in a three-necked flask containing 500 mL of tetrahydrofuran, and evacuation was carried out. Under the condition of continuously introducing N2, 0.05 g of an azobisisobutyronitrile initiator was added to the above-mentioned three-necked flask, and the three-necked flask was then heated to 70° C. After stirring and reacting at 70° C. for 12 h, the obtained product was poured into glacial ether at 0° C. for sedimentation, the white solid powder resulting from sedimentation was dissolved in 200 mL of tetrahydrofuran, 10.8 g of sodium methoxide was dropwise added to the reaction flask, and the mixture was stirred at room temperature for 3 h. After the stirring was completed, the reaction product was concentrated with a rotary evaporator, and the concentrated reaction product was then transferred to a dialysis bag of molecular weight 10,000 for dialysis for 24 h, and after freeze-drying, the copolymer of Example 1 as represented by the following structural formula was obtained

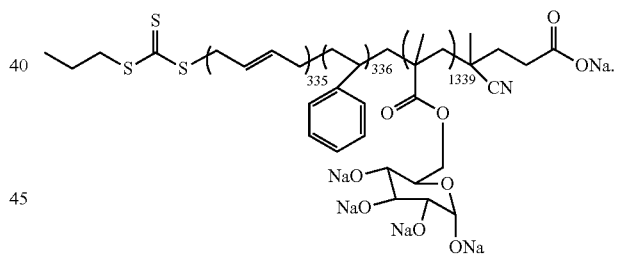

Example 2

The only differences from Example 1 lay in that in step 1, raw material 1 was replaced with 18.6 g of glucosamine (CAS: 3416-24-8); in step 2, the added mass of raw material 3 was changed to 0.5 g, the added amount of raw material 4 was changed to 6.8 g; and in step 3, the reagent for removing hydroxyl protecting groups was replaced with 13.6 g of sodium ethoxide, and the other preparation conditions were the same as in Example 1.

Example 3

The only differences from Example 1 lay in that in step 1, the added amount of raw material 1 was changed to 20 g, and the added amount of raw material 2 was changed to 12 g; in step 2, raw material 3 was replaced with 33.9 g of methylstyrene (CAS: 766-90-5), and raw material 4 was replaced with 6.8 g of isoprene (CAS: 75-79-5); and in step 3, the reagent for removing hydroxyl protecting groups was replaced with 7.6 g of lithium methoxide, and the other preparation conditions were the same as in Example 1.

Example 4

The only differences from Example 1 lay in that in step 1, the added amount of raw material 1 was changed to 12.5 g, and the added amount of raw material 2 was changed to 6 g; in step 2, raw material 3 was replaced with 4.1 g of aminostyrene (CAS: 5395-28-8), and raw material 4 was replaced with 8.2 g of dimethylbutadiene (CAS: 4513-81-5); and in step 3, the reagent for removing hydroxyl protecting groups was replaced with 10.4 g of lithium ethoxide, and the other preparation conditions were the same as in Example 1.

Example 5

The only differences from Example 1 lay in that in step 1, the added amount of raw material 1 was changed to 16.9 g, and the added amount of raw material 2 was changed to 9 g; and in step 2, raw material 3 was replaced with 6.6 g of ethylstyrene (CAS: 1005-64-7), raw material 4 was replaced with 19.2 g of tetrachlorobutadiene (CAS: 58334-79-5), and the other preparation conditions were the same as in Example 1.

Example 6

The only differences from Example 1 lay in that in step 1, the added amount of raw material 1 was changed to 26.7 g, and the added amount of raw material 2 was changed to 13 g; and in step 2, the added amount of raw material 3 was 6.3 g, and raw material 4 was replaced with 26.1 g of hexachlorobutadiene (CAS: 87-68-3), and the other preparation conditions were the same as in Example 1.

Example 7

The only differences from Example 1 lay in that in step 1, the added amount of raw material 1 was changed to 3.6 g, and the added amount of raw material 2 was changed to 2 g; and in step 2, raw material 3 was replaced with 0.6 g of methylstyrene (CAS: 98-83-9), and raw material 4 was replaced with 8.9 g of neoprene (CAS: 9010-98-4), and the other preparation conditions were the same as in Example 1.

Example 8

The only differences from Example 1 lay in that in step 1, the added amount of raw material 1 was changed to 5.1 g, and the added amount of raw material 2 was changed to 3 g; and in step 2, raw material 3 was replaced with 1.3 g of α-ethylstyrene (CAS: 2039-93-2), raw material 4 was replaced with 8.9 g of chlorobutadiene (CAS: 126-99-8), and the other preparation conditions were the same as in Example 1.

Example 9

The only differences from Example 1 lay in that in step 1, the added amount of raw material 1 was changed to 2.2 g, and the added amount of raw material 2 was changed to 1 g; and in step 2, the added amount of raw material 3 was changed to 2.1 g, and raw material 4 was replaced with 8.2 g of ethylbutadiene (CAS: 3404-63-5), and the other preparation conditions were the same as in Example 1.

Example 10

The only differences from Example 1 lay in that in step 1, the added amount of raw material 1 was changed to 2.0 g, and raw material 2 was replaced with 2 g of β-phenylacryloyl chloride (CAS: 102-92-1); in step 2, the added amount of raw material 3 was changed to 0.4 g, and raw material 4 was replaced with 8.2 g of hexadiene (CAS: 59-2-483); and in step 3, the reagent for removing hydroxyl protecting groups was replaced with 7.6 g of lithium methoxide, and the other preparation conditions were the same as in Example 1.

Example 11

The only differences from Example 1 lay in that in step 1, the added amount of raw material 1 was changed to 7.2 g, and raw material 2 was replaced with 5 g of ethylacryloyl chloride (CAS: 4390-96-9); in step 2, the added amount of raw material 3 was changed to 0.7 g, and raw material 4 was replaced with 13.1 g of butadienylbenzene (CAS: 16939-57-4); and in step 3, the reagent for removing hydroxyl protecting groups was replaced with 14 g of lithium methoxide, and the other preparation conditions were the same as in Example 1.

Example 12

The only differences from Example 1 lay in that in step 1, the added amount of raw material 1 was changed to 5.8 g, and raw material 2 was replaced with 4 g of propylacryloyl chloride (CAS: 78450-85-8); in step 2, the added amount of raw material 3 was changed to 0.6 g, and raw material 4 was replaced with 16.5 g of chlorobutadienylbenzene (CAS: 18684-87-2); and in step 3, the reagent for removing hydroxyl protecting groups was replaced with 16.8 g of lithium ethoxide, and the other preparation conditions were the same as in Example 1.

Example 13

The only differences from Example 1 lay in that in step 1, the added amount of raw material 1 was changed to 5.3 g, and raw material 2 was replaced with 3 g of fluoroacryloyl chloride (CAS: 16522-55-7); and in step 2, raw material 3 was replaced with 0.5 g of aminostyrene (CAS: 5395-28-8), raw material 4 was replaced with 36.2 g of tetraphenylbutadiene, and the other preparation conditions were the same as in Example 1.

Example 14

The only differences from Example 1 lay in that in step 1, the added amount of raw material 1 was changed to 5.8 g, and raw material 2 was replaced with 4 g of ethoxyacryloyl chloride (CAS: 6191-99-7); and in step 2, the added amount of raw material 3 was changed to 0.9 g, and raw material 4 was replaced with 23.4 g of methylphenylbutadiene (CAS: 93874-11-4), and the other preparation conditions were the same as in Example 1.

Example 15

The only differences from Example 1 lay in that in step 1, the added amount of raw material 1 was changed to 5.0 g, and raw material 2 was replaced with 5 g of butoxyacryloyl chloride (CAS: 75945-53-8); and in step 2, raw material 3 was replaced with 1.6 g of 2-(diethylamino)ethylstyrene (CAS: 74952-73-1), raw material 4 was replaced with 24.2 g of difluorophenylbutadiene (CAS: 3888-61-7), and the other preparation conditions were the same as in Example 1.

Example 16

The preparation conditions of Example 16 were the same as those of Example 12, except that in step 2, the added amount of azobisisobutyronitrile was 0.1 g.

Example 17

The preparation conditions of Example 16 were the same as those of Example 12, except that in step 2, the added amount of azobisisobutyronitrile was 0.01 g.

Example 18

The preparation conditions of Example 18 were the same as those of Example 1, except that in step 1, the added amount of glucose was 55 g and the added amount of methacryloyl chloride was 27 g; and in step 2, the added amount of styrene was 38 g.

Example 19

The preparation conditions of Example 19 were the same as those of Example 10, except that in step 2, the added amount of styrene was 0.3 g.

Example 20

The preparation conditions of Example 20 were the same as those of Example 10, except that in step 1, the added amount of glucose was 1.2 g and the added amount of β-phenylacryloyl chloride was 1 g.

Example 21

The preparation conditions of Example 21 were the same as those of Example 10, except that in step 1, the added amount of glucose was 24 g and the added amount of β-phenylacryloyl chloride was 24 g.

Example 22

The preparation conditions of Example 22 were the same as those of Example 10, except that in step 1, the added amount of glucose was 48 g and the added amount of β-phenylacryloyl chloride was 48 g.

Comparative Example 1

The binder of Comparative Example 1 was SBR, and the dispersant and thickener were CMC.

Comparative Example 2

The binder of Comparative Example 1 was SBR.

Preparation of Negative Electrode Sheet

1. Preparation of Negative Electrode Sheets Corresponding to Examples 1-22

Graphite, a conductive agent and the binder of Examples 1-22 were dry-mixed at a mass ratio of 97:1:2, deionized water was then added to adjust the solid content to 45-55%, the mixture was stirred uniformly to obtain a negative electrode slurry, and the negative electrode slurry was then coated, dried, cold-pressed, and slit to form a negative electrode sheet.

2. Preparation of Negative Electrode Sheet Corresponding to Comparative Example 1

Graphite, a conductive agent, CMC and SBR were mixed at a mass ratio of 96.5:1:1:1.5, deionized water was added to adjust the solid content to 45-55%, the mixture was stirred uniformly to obtain a negative electrode slurry, and the negative electrode slurry was then coated, dried, cold-pressed, and slit to form a negative electrode sheet.

3. Preparation of Negative Electrode Sheets Corresponding to Comparative Example 2

Graphite, a conductive agent and SBR were mixed at a mass ratio of 96.5:1: 1.5, deionized water was added to adjust the solid content to 45-55%, the mixture was stirred uniformly to obtain a negative electrode slurry, and the negative electrode slurry was then coated, dried, cold-pressed, and slit to form a negative electrode sheet.

Preparation of Positive Electrode Sheet

A ternary positive electrode material, conductive carbon, and a binder polyvinylidene fluoride (PVDF) were mixed uniformly at a mass ratio of 96:2.5:1.5, the solvent NMP was then added to adjust the solid content to 70-80%, the mixture was stirred uniformly to obtain a positive electrode slurry, and the positive electrode slurry was then coated, dried, cold-pressed, and slit to form a positive electrode sheet.

Preparation of Electrolyte Solution

Ethylene carbonate, ethyl methyl carbonate and diethyl carbonate were prepared into a mixed solution at a volume ratio of 20:20:60, and a fully dried lithium salt was then dissolved in the above-mentioned mixed solution and mixed uniformly to obtain an electrolyte solution. The concentration of the lithium salt therein was 1 mol/L. The entire operation process was carried out in an argon atmosphere glove box with a water content less than 10 ppm.

Preparation of Separator

A polyethylene membrane with a thickness of 12 μm was used as a substrate, and a 2 μm coating layer was coated on the surface as a separator.

Preparation of Secondary Battery

The negative electrode sheet, separator, and positive electrode sheet in Examples 1-22 and Comparative Example 1 were stacked in order, with the separator being located between the positive and negative electrode sheets, the stack was then wound into an electrode assembly, and the electrode assembly was loaded into an aluminum shell and baked at 80° C. to remove water, the electrolyte solution was then immediately injected, and after sealing, an uncharged secondary battery was obtained. The uncharged secondary battery was then subjected to processes such as standing, hot and cold pressing, chemical formation, reshaping, and capacity testing to obtain a secondary battery product.

Binder Related Test

1. Infrared Spectroscopy Test of Binder

According to infrared spectroscopy of the standard GB/T6040-2002, IS10 Fourier transform infrared spectrometer from Nicolet, U.S., was used to measure the structural composition of the binders corresponding to all the examples and comparative examples. The test wave number range was 400-4000 cm-1.

2. Binder Floating

The dispersing properties of the binders were tested by electron probe X-ray microanalysis.

According to the standard GB/T32055-2015, the binder-containing positive/negative electrode sheets corresponding to all the examples and comparative examples were observed using Japan Shimadzu EPMA-1720 instrument with W lamp filament as an emission source for X-ray, wherein the extraction angle was 52.5° C.

3. Test for Binding Properties of Binder

The negative electrode sheet of each of the examples and comparative examples was taken and cut into a test sample with a length of 100 mm and a width of 10 mm. A stainless steel plate with a width of 25 mm was taken, pasted with a double-sided adhesive tape (width 11 mm), the test sample was pasted on the double-sided adhesive tape on the stainless steel plate, and the surface thereof was rolled back and forth three times with a 2000 g roller (300 mm/min). The test sample was bent 180 degrees, the negative electrode film layer of the test sample was manually peeled off from a current collector by 25 mm, the test sample was fixed on a testing machine (such as INSTRON 336), the peeling face was kept in line with a testing machine force line, the testing machine performed continuous peeling at 30 mm/min to obtain a peeling force curve, the average value of a smooth stage was taken as the peeling force F0, and the binding force F between the negative electrode membrane and the current collector in the test sample was then calculated by the following equation.

F=F0/width of test sample (unit of measurement of F: N/m)

4. Characterization of the Dispersing and Thickening Properties of the Binder

The viscosity of the binder of the present application was tested using a HAAKE Viscotester rotational viscometer, wherein the test rotational speed was 12 r/s, and the specific test method was in accordance with the standard GB/T22235-2008.

Electrode Sheet Resistance Test

According to the standard GB/T32055-2015, by means of Nobuhiro Hioki BT3563S resistance meter, the negative electrode sheet of each of the examples and comparative examples was taken and placed on a test table of the resistance meter for testing, wherein the area of the test electrode sheet was 154.025 mm2, the test pressure was more than or equal to 0.4 T, and the time interval was 10 s.

Battery Cycling Performance Test

At 45° C., the secondary battery prepared in each of the examples and comparative examples was charged in a constant current manner at a rate of 1 C to a charge cut-off voltage of 4.30 V, then charged at a constant voltage to a current of less than or equal to 0.05 C, left to stand for 10 min, then discharged in a constant current manner at a rate of 1 C to a discharge cut-off voltage of 3.3 V, and left to stand for 10 min. This was a charge-discharge cycle. According to this method, the battery was tested for charge and discharge cycles until the battery capacity decayed to 80%, and the corresponding number of cycles at this time was recorded.

| | | | Example 1 | Example 2 | Example 3 | Example 4 | Example 5 | Example 6 | Example 7 | Example 8 | Example 9 | Example 10 | Example 11 | Example 12 |
|---|---|---|---|---|---|---|---|---|---|---|---|---|---|---|
| Copolymer | Building block (i) | R1 | H | H | Methyl | Methyl | —Cl | —Cl | —Cl | H | Ethyl | H | H | H |
| | | R2 | H | H | H | Methyl | —Cl | —Cl | H | H | H | H | H | H |
| | | R3 | H | H | H | H | H | —Cl | H | H | H | H | H | —Cl |
| | | R4 | H | H | H | H | H | —Cl | H | H | H | H | H | H |
| | | R5 | H | H | H | H | —Cl | —Cl | H | —Cl | H | H | Phenyl | H |
| | | R6 | H | H | H | H | —Cl | —Cl | H | H | H | Ethyl | H | Phenyl |
| | Building block (ii) | R7 | H | H | H | H | H | H | H | H | H | H | H | H |
| | | R8 | H | H | Methyl | Amino | Ethyl | H | H | H | H | H | H | H |
| | | R9 | H | H | H | H | H | H | Methyl | Ethyl | H | H | H | H |
| | Building block (II) | R10 | H | H | Methyl | H | H | H | H | H | H | Phenyl | Ethyl | Propyl |
| | | R11 | —O— | —NH— | —O— | —O— | —O— | —O— | —O— | —O— | —O— | —O— | —O— | —O— |
| | | M | Sodium | Sodium | Lithium | Lithium | Sodium | Sodium | Sodium | Sodium | Sodium | Lithium | Potassium | Potassium |
| | a/b | | 1 | 4 | 3 | 4 | 2 | 3 | 20 | 10 | 9 | 48 | 26 | 33 |
| | (a + b)/c | | 0.5 | 1.2 | 1.2 | 1.8 | 1.6 | 0.9 | 5.2 | 3.9 | 8.9 | 9.2 | 2.6 | 3.2 |
| | Molecular weight (×10,000) | | 50 | 60 | 32 | 55 | 98 | 77 | 10 | 153 | 37 | 189 | 49 | 5.5 |
| Effect evaluation | Binding force (N/m) | | 18 | 16 | 16 | 15 | 15 | 16 | 13 | 13 | 15 | 14 | 14 | 15 |
| | electrode sheet resistance ($10^{-3}$ Ω) | | 3 | 6 | 5 | 6 | 6 | 8 | 6 | 7 | 6 | 7 | 8 | 7 |
| | Number of cycles (@80% SOH) | | 2480 | 2250 | 2130 | 2100 | 2050 | 2250 | 1890 | 1800 | 1920 | 1950 | 1860 | 1830 |

-continued

| | | | Example 13 | Example 14 | Example 15 | Example 16 | Example 17 | Example 18 | Example 19 | Example 20 | Example 21 | Example 22 | Comparative Example 1 | Comparative Example 2 |
|---|---|---|---|---|---|---|---|---|---|---|---|---|---|---|
| Co-polymer | Building block (i) | R1 | Phenyl | H | H | H | H | H | H | H | H | H | SBR + CMC | SBR |
| | | R2 | Phenyl | H | H | H | H | H | H | H | H | H | | |
| | | R3 | Phenyl | p-Tolyl | P-Fluoro-phenyl | —Cl | H | H | H | H | H | H | | |
| | | R4 | H | p-Tolyl | P-Fluoro-phenyl | H | H | H | H | H | H | H | | |
| | | R5 | H | H | H | H | H | H | H | H | H | H | | |
| | | R6 | Phenyl | H | H | Phenyl | Ethyl | H | Ethyl | Ethyl | Ethyl | Ethyl | | |
| | Building block (ii) | R7 | H | H | H | H | H | H | H | H | H | H | | |
| | | R8 | Amino | Ethyl | # | H | H | H | H | H | H | H | | |
| | | R9 | H | H | H | H | H | H | H | H | H | H | | |
| | Building block (II) | R10 | —F | Butoxy | Ethoxy | Propyl | Phenyl | H | Phenyl | Phenyl | Phenyl | Phenyl | | |
| | | R11 | —O— | —O— | —O— | —O— | —O— | —O— | —O— | —O— | —O— | —O— | | |
| | | M | Sodium | Sodium | Sodium | Potassium | Lithium | Sodium | Lithium | Lithium | Lithium | Lithium | | |
| | a/b | | 35 | 15 | 13 | 33 | 48 | 0.5 | 60 | 46 | 4 | 5 | | |
| | (a + b)/c | | 3.5 | 3.3 | 3.9 | 3.2 | 9.2 | 0.5 | 9.3 | 15 | 0.1 | 0.05 | | |
| | Molecular weight (×10,000) | | 126 | 63 | 98 | 3 | 250 | 48 | 167 | 167 | 63 | 59 | | |
| Effect evaluation | Binding force (N/m) | | 15 | 14 | 16 | 13 | 13 | 12 | 13 | 12 | 14 | 13 | 12 | 10 |
| | electrode sheet resistance ($10^{-3}$ Ω) | | 6 | 7 | 6 | 9 | 9 | 8 | 9 | 8 | 6 | 8 | 11.5 | 15 |
| | Number of cycles (@80% SOH) | | 1870 | 1890 | 2150 | 1580 | 1530 | 1780 | 1660 | 1590 | 1980 | 1630 | 1520 | 1380 |

Note:
\# represents —$CH_2$—$CH_2$—N—$(CH_2CH_3)_2$ group

Figure 2:
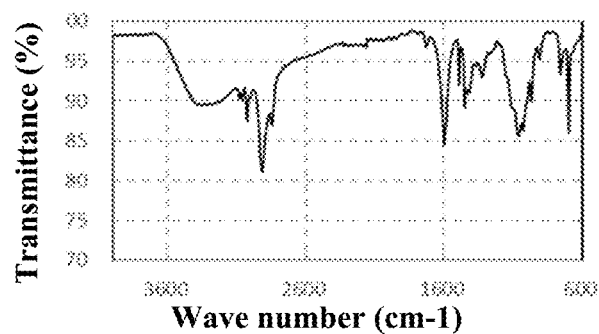
FIG. 2 is an infrared spectrogram of a binder according to Example 1 of the present application.

Composition Analysis of the Binders in the Examples of the Present Application As can be seen from FIG. 2, the infrared spectrum of the binder of Example 1 shows that the peak at 3200 cm-1 is a stretching vibration peak of O—H, and this type of peak corresponds to intramolecular, intermolecular and freely moving hydroxyl groups; the peak at 2875 cm-1 is a stretching vibration peak of C—H; the peaks at 1593 cm-1 and 1417 cm-1 are respectively symmetric and asymmetric stretching vibration peaks of COO—; and the peak at 1055 cm-1 is a stretching vibration peak of C—O—C in the glycosidic bond. The molecular composition of the synthesized binder can be characterized by infrared spectroscopy.

Figure 3:
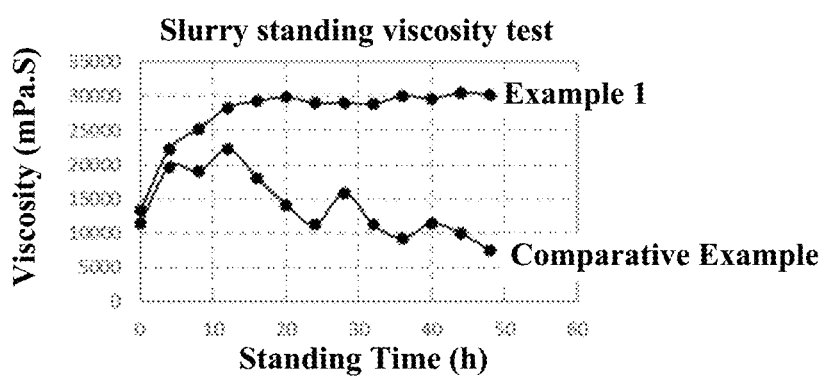
FIG. 3 is a comparison diagram of the viscosities of negative electrode slurries of Example 1 of the present application and Comparative Example 1.
Figure 4:
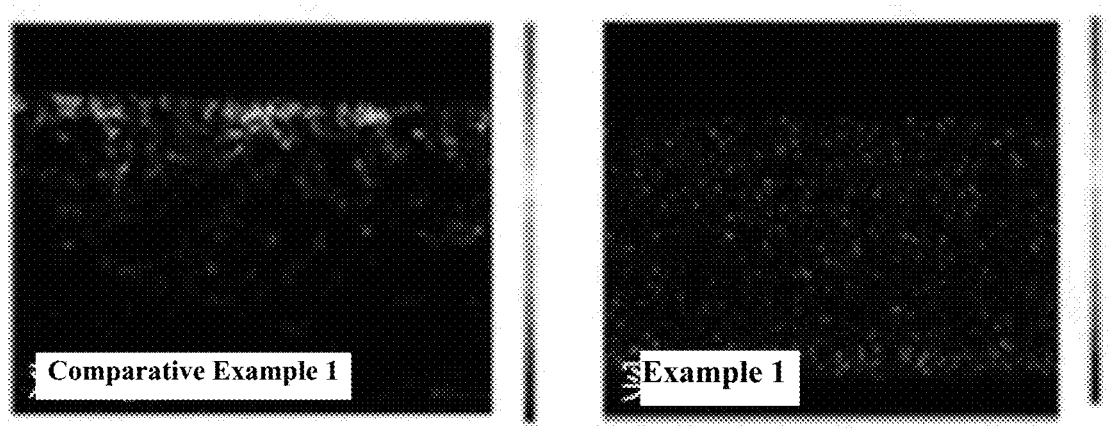
FIG. 4 is X-ray micrographs of the negative electrode sheets of Example 1 of the present application and Comparative Example 1.
Figure 5:
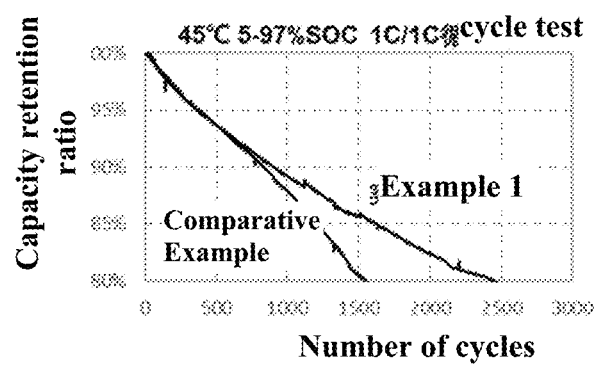
FIG. 5 is cycling performance graphs of Example 1 of the present application and Comparative Example 1.

Comparison of Various Effects Between the Binders in the Examples of the Present Application and the Comparative Examples From the data in Table 1, it can be seen that the novel multifunctional binders corresponding to Examples 1-22 are more advantageous in binding properties and has lower electrode sheet resistance compared to Comparative Example 1; the electron probe X-ray microanalysis diagram of FIG. 4 also shows that the binder of Example 1 (the bright part in the figure) is evenly distributed and has good dispersing properties, whereas the binder of Comparative Example 1 shows significant floating. In FIG. 3, the slurry viscosity test experiment also shows that compared to Comparative Example 1, the binder of Example 1 has higher viscosity and better thickening effects. Compared to Comparative Example 1, the secondary batteries prepared from the binders of Examples 1-22 of the present application have significant cycling performance advantages.

Analysis of the Influence of the Number of Polymerized Units (a+b)/c in Each Building Block on Related Properties From the comparison of 1, 2, 10, 15, 20, 21, and 22 in Table 1, it can be seen that the number of polymerized units (a+b)/c in each building block in each of the corresponding copolymers in Examples 1, 2, 3, 6, 10, 12, 15, and 21 is in the range of 0.1-10, and therefore, the binding properties of the binder, the resistance of the electrode sheet and the cycling performance of the battery are excellent; in addition, from Examples 1, 2, 3, 6, 12, and 15, it can be seen that where the number of polymerized units (a+b)/c in each building block in the copolymer is in the range of 0.5-4, the binding properties of the above-mentioned binder, the resistance of the electrode sheet and the cycling performance of the battery are more excellent.

However, where the number of polymerized units (a+b)/c (0.05) in each building block in the corresponding copolymer of Example 20 is relatively low and the number of polymerized units (a+b)/c (15) in each building block in the corresponding copolymer of Example 22 is relatively high, the binding properties of the binder, the resistance of the electrode sheet and the cycling performance of the battery in the corresponding case are influenced to a certain degree.

Analysis of the Influence of the Number of Polymerized Units a/b in Each Building Block on Related Properties From the comparison of 1, 2, 6, 10, 15, 18, and 19 in Table 1, it can be seen that the number of polymerized units a/b in each building block in each of the corresponding copolymers of Examples 1, 2, 6, 10, and 15 is in the range of 1-50, and therefore, the binding properties of the binder, the resistance of the electrode sheet and the cycling performance of the battery are excellent; in addition, from Examples 1, 2, 3, 6, and 15, it can be seen that where the number of polymerized units a/b in each building block in the copolymer is in the range of 1-13, the binding properties of the above-mentioned binder, the resistance of the electrode sheet and the cycling performance of the battery are more excellent.

However, where the number of polymerized units a/b (0.5) in each building block in the corresponding copolymer of Example 18 is relatively low and the number of polymerized units a/b (60) in each building block in the corresponding copolymer of Example 19 is relatively high, the binding properties of the binder, the resistance of the electrode sheet and the cycling performance of the battery in the corresponding case are influenced to a certain degree.

Analysis of the Influence of the Molecular Weight of the Copolymer in the Binder on Related Properties From the comparison of 1, 2, 3, 6, 10, 12, 15, 16, and 17 in Table 1, it can be seen that the number average molecular weight of each of the corresponding copolymers in Examples 1, 2, 3, 6, 10, 12, and 15 is in the range of 50,000-2,000,000, and therefore, the binding properties of the binder, the resistance of the electrode sheet and the cycling performance of the battery are excellent; in addition, from Examples 1, 2, 3, 6, and 15, it can be seen that where the number average molecular weight of the copolymer is in the range of 300,000-1,000,000, the binding properties of the above-mentioned binder, the resistance of the electrode sheet and the cycling performance of the battery are more excellent.

However, where the number average molecular weight (30,000) of the corresponding copolymer in Example 16 is relatively low and the number average molecular weight (2,500,000) of the corresponding copolymer in Example 17 is relatively high, the binding properties of the binder, the resistance of the electrode sheet and the cycling performance of the battery in the corresponding case are influenced to a certain degree.

It should be noted that the present application is not limited to the above-mentioned embodiments. The above-described embodiments are merely exemplary, and embodiments having substantively the same composition as the technical idea and exerting the same effects within the scope of the technical solution of the present application are all included in the technical scope of the present application. In addition, without departing from the gist of the present application, various modifications that can be conceived by those skilled in the art and applied to the embodiments, and other modes constructed by combining some of the components in the embodiments are also included in the scope of the present application.

What is claimed is:

1. A binder, comprising:

a copolymer including a building block (I) and a building block (II), the building block (I) being formed by copolymerizing a building block (i) and a building block (ii);

wherein:

in the building block (i), R1-R6 each independently represent a hydrogen atom, a halogen atom, an unsubstituted or substituted alkyl with 1-6 carbon atoms, an unsubstituted or substituted alkoxy with 1-6 carbon atoms, an unsubstituted or substituted alkenyl with 1-6 carbon atoms, an unsubstituted or substituted aryl with 6-20 carbon atoms, hydroxyl, or amino, and substituents in the substituted alkyl with 1-6 carbon atoms, the substituted alkoxy with 1-6 carbon atoms, the substituted alkenyl with 1-6 carbon atoms, or the aryl with 6-20 carbon atoms in R1-R6 are selected from at least one of hydroxyl, amino, amido, cyano, carboxyl, or a halogen atom,

in the building block (ii), R7-R9 each independently represent a hydrogen atom, an unsubstituted or substituted alkyl with 1-6 carbon atoms, an unsubstituted or substituted alkoxy with 1-6 carbon atoms, an unsubstituted or substituted alkylamino with 1-6 carbon atoms, an unsubstituted or substituted alkenyl with 1-6 carbon atoms, an unsubstituted or substituted aryl with 6-20 carbon atoms, hydroxyl, or amino, and substituents in the substituted alkyl with 1-6 carbon atoms, the substituted alkoxy with 1-6 carbon atoms, the substituted alkylamino with 1-6 carbon atoms, the substituted alkenyl with 1-6 carbon atoms, or the substituted aryl with 6-20 carbon atoms in R7-R9 are selected from at least one of hydroxyl, carboxyl, amino, amido, or a halogen atom, and

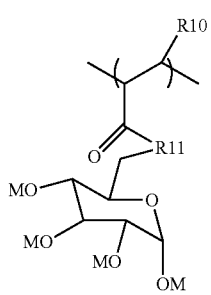

(II)

in the building block (II), R10 represents a hydrogen atom, a halogen atom, an unsubstituted or substituted alkyl with 1-6 carbon atoms, an unsubstituted or substituted alkoxy with 1-6 carbon atoms, an unsubstituted or substituted alkenyl with 1-6 carbon atoms, an unsubstituted or substituted aryl with 6-20 carbon atoms, hydroxyl, or amino, substituents in the substituted alkyl with 1-6 carbon atoms, the substituted alkoxy with 1-6 carbon atoms, the substituted alkenyl with 1-6 carbon atoms, or the aryl with 6-20 carbon atoms in R10 are selected from at least one of hydroxyl, carboxyl, amino, amido, cyano, or a halogen atom, and R11 represents a bridging oxo group or a bridging imino group, and a plurality of M each independently represent one of Li, Na, K, Rb and Cs.

2. The binder according to claim 1, wherein:
a ratio of a sum of a monomeric average molar number, a, of the building block (i) and a monomeric average molar number, b, of the building block (ii) to a monomeric average molar number, c, of the building block (II) is (a+b)/c=0.1-10.

3. The binder according to claim 2, wherein:
the ratio of the sum of the monomeric average molar number, a, of the building block (i) and the monomeric average molar number, b, of the building block (ii) to the monomeric average molar number, c, of the building block (II) is (a+b)/c=0.5-4.

4. The binder according to claim 1, wherein:
a ratio of a monomeric average molar number, a, of the building block (i) to a monomeric average molar number, b, of the building block (ii) is a/b=1-50.

5. The binder according to claim 4, wherein:
the ratio of the monomeric average molar number, a, of the building block (i) to the monomeric average molar number, b, of the building block (ii) is a/b=1-13.

6. The binder according to claim 1, wherein:
in the building block (i), R1-R6 each independently represent a hydrogen atom or an unsubstituted or substituted linear, branched, or cyclic alkyl with 1-6 carbon atoms.

7. The binder according to claim 6, wherein:
in the building block (i), R1-R6 each independently represent a hydrogen atom or a linear or branched alkyl with 1-3 carbon atoms.

8. The binder according to claim 7, wherein:
in the building block (i), R1-R6 each independently represent a hydrogen atom or a linear alkyl with 1-3 carbon atoms.

9. The binder according to claim 1, wherein:
in the building block (ii), R7-R9 each independently represent a hydrogen atom or an unsubstituted or substituted linear, branched, or cyclic alkyl with 1-6 carbon atoms.

10. The binder according to claim 9, wherein:
in the building block (ii), R7-R9 each independently represent a hydrogen atom or a linear or branched alkyl with 1-3 carbon atoms.

11. The binder according to claim 10, wherein:
in the building block (ii), R7-R9 each independently represent a hydrogen atom or a linear alkyl with 1-3 carbon atoms.

12. The binder according to claim 1, wherein:
in the building block (II), R10 represents a hydrogen atom, a halogen atom, or an unsubstituted or substituted linear, branched, or cyclic alkyl with 1-6 carbon atoms.

13. The binder according to claim 12, wherein:
in the building block (II), R10 represents a hydrogen atom, a halogen atom, or a linear or branched alkyl with 1-3 carbon atoms.

14. The binder according to claim 13, wherein:
in the building block (II), R10 represents a hydrogen atom, a halogen atom, or a linear alkyl with 1-3 carbon atoms.

15. The binder according to claim 1, wherein:
in the building block (II), R11 represents a bridging oxo group.

16. The binder according to claim 1, wherein:
in the building block (II), the plurality of M each independently represent one of Li, Na, and K.

17. The binder according to claim 1, wherein:
a number average molecular weight of the copolymer is 50,000 to 2,000,000.

18. The binder according to claim 17, wherein:
the number average molecular weight of the copolymer is 300,000 to 1,000,000.

19. A preparation method of the binder according to claim 1, comprising:
synthesizing the building block (II);
polymerizing the building block (i) with the building block (ii) to form the building block (I); and
adding the building block (II) to the building block (I) to form the copolymer contained in the binder.

20. A secondary battery comprising an electrode sheet, the electrode sheet including a binder including:
a copolymer including a building block (I) and a building block (II), the building block (I) being formed by copolymerizing a building block (i) and a building block (ii);
wherein:

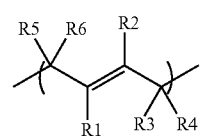

(i)

in the building block (i), R1-R6 each independently represent a hydrogen atom, a halogen atom, an unsubstituted or substituted alkyl with 1-6 carbon atoms, an unsubstituted or substituted alkoxy with 1-6 carbon atoms, an unsubstituted or substituted alkenyl with 1-6 carbon atoms, an unsubstituted or substituted aryl with 6-20 carbon atoms, hydroxyl, or amino, and substituents in the substituted alkyl with 1-6 carbon atoms, the substituted alkoxy with 1-6 carbon atoms, the substituted alkenyl with 1-6 carbon atoms, or the aryl with 6-20 carbon atoms in R1-R6 are selected from at least one of hydroxyl, amino, amido, cyano, carboxyl, or a halogen atom,

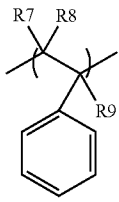
(ii)

in the building block (ii), R7-R9 each independently represent a hydrogen atom, an unsubstituted or substituted alkyl with 1-6 carbon atoms, an unsubstituted or substituted alkoxy with 1-6 carbon atoms, an unsubstituted or substituted alkylamino with 1-6 carbon atoms, an unsubstituted or substituted alkenyl with 1-6 carbon atoms, an unsubstituted or substituted aryl with 6-20 carbon atoms, hydroxyl, or amino, and substituents in the substituted alkyl with 1-6 carbon atoms, the substituted alkoxy with 1-6 carbon atoms, the substituted alkylamino with 1-6 carbon atoms, the substituted alkenyl with 1-6 carbon atoms, or the substituted aryl with 6-20 carbon atoms in R7-R9 are selected from at least one of hydroxyl, carboxyl, amino, amido, or a halogen atom, and

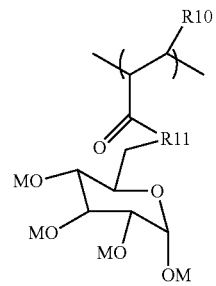
(II)

in the building block (II), R10 represents a hydrogen atom, a halogen atom, an unsubstituted or substituted alkyl with 1-6 carbon atoms, an unsubstituted or substituted alkoxy with 1-6 carbon atoms, an unsubstituted or substituted alkenyl with 1-6 carbon atoms, an unsubstituted or substituted aryl with 6-20 carbon atoms, hydroxyl, or amino, substituents in the substituted alkyl with 1-6 carbon atoms, the substituted alkoxy with 1-6 carbon atoms, the substituted alkenyl with 1-6 carbon atoms, or the aryl with 6-20 carbon atoms in R10 are selected from at least one of hydroxyl, carboxyl, amino, amido, cyano, or a halogen atom, and R11 represents a bridging oxo group or a bridging imino group, and a plurality of M each independently represent one of Li, Na, K, Rb and Cs.

* * * * *